(12) United States Patent
Hals

(10) Patent No.: US 6,910,702 B1
(45) Date of Patent: Jun. 28, 2005

(54) ALL-SUSPENSION BICYCLE FRAME WITH ISOLATED DRIVE GEAR

(76) Inventor: Cato Hals, Sörbråtveien 34, Oslo (NO) N-0891

( * ) Notice: Subject to any disclaimer, the term of this patent is extended or adjusted under 35 U.S.C. 154(b) by 149 days.

(21) Appl. No.: 09/980,247

(22) PCT Filed: Jun. 5, 2000

(86) PCT No.: PCT/NO00/00194

§ 371 (c)(1),
(2), (4) Date: Nov. 30, 2001

(87) PCT Pub. No.: WO00/75004

PCT Pub. Date: Dec. 14, 2000

(30) Foreign Application Priority Data

Jun. 4, 1999 (NO) ..................................... 992744
Jun. 4, 1999 (NO) ..................................... 992745

(51) Int. Cl.[7] ............................................. B62M 1/14
(52) U.S. Cl. ....................... 280/286; 280/283; 280/284
(58) Field of Search ........................ 280/275, 283–286, 280/288

(56) References Cited

U.S. PATENT DOCUMENTS

| 4,951,791 | A |   | 8/1990 | Creixell ..................... 180/219 |
|---|---|---|---|---|
| 5,205,572 | A | * | 4/1993 | Buell et al. ................. 280/284 |
| 5,295,702 | A |   | 3/1994 | Buell .......................... 280/284 |
| 5,370,411 | A |   | 12/1994 | Takamiya et al. ........... 280/284 |
| 5,413,368 | A |   | 5/1995 | Pong et al. ................. 280/277 |
| 5,462,302 | A |   | 10/1995 | Leitner ....................... 280/277 |
| 5,474,318 | A | * | 12/1995 | Castellano .................. 280/284 |
| 5,498,013 | A | * | 3/1996 | Hwang ....................... 280/283 |
| 5,628,524 | A | * | 5/1997 | Klassen et al. ............. 280/284 |
| 5,685,553 | A | * | 11/1997 | Wilcox et al. .............. 280/283 |
| 5,899,480 | A | * | 5/1999 | Leitner ....................... 280/284 |
| 6,076,845 | A | * | 6/2000 | Lawwill et al. ............. 280/284 |
| 6,131,934 | A | * | 10/2000 | Sinclair ...................... 280/284 |
| 6,244,610 | B1 | * | 6/2001 | Kramer-Massow ........ 280/283 |
| 6,293,574 | B1 | * | 9/2001 | Storck ........................ 280/284 |

FOREIGN PATENT DOCUMENTS

WO          9746443          12/1997

* cited by examiner

*Primary Examiner*—Lesley D. Morris
*Assistant Examiner*—L. Lum
(74) *Attorney, Agent, or Firm*—Wenderoth, Lind & Ponack, L.L.P.

(57) ABSTRACT

A frame assembly for a two-wheel vehicle includes a front wheel fork and chainstays. Between the front wheel fork and the chainstays, the frame assembly further includes a saddle tube, a crank housing, and a lower tube connecting the crank housing to a steering tube. A parallelogram-shaped suspension assembly is attached to a rear end of the chainstays.

15 Claims, 8 Drawing Sheets

ALL-SUSPENSION BICYCLE FRAME WITH ISOLATED DRIVE GEAR

THE INVENTION

This invention pertains to a suspension system and power transmission on a two-wheeled vehicle, predominantly a bicycle or motorcycle. More precisely put, the invention pertains to a suspension system for the rear wheel and the power transmission, as well as a suspension fork assembly.

A DESCRIPTION OF RELATED TECHNOLOGY

There are a number of existing prior art suspension designs for bicycle wheels. Recent variations include one in which the entire power transmission is mounted in the bicycle's rear frame triangle, also called chainstays, which in turn are mounted to the main frame with a joint. The suspension allows the chainstays to move relative to the main frame, provided the chainstays have been joined at an appropriate point to the main frame. It follows that as the rearwheel hits a bump, the entire rear triangle of the bicycle will change its position relative to the main frame, thus isolating the main frame from the impact. The impact, in other words, does not transplant itself to the rider through the saddle, the pedals or the handlebar. The chainstays are typically joined to the main frame with a bearing placed close to the crankset. In several variations of this construction, the chainstays are joined to the main frame at a higher point, closer to the crossbar.

The advantage of this type of construction is that the suspension does not affect the power transmission apart from shuttling the lower part of the bicyclist's legs back and forth. The disadvantage of this type of construction is a considerable shaking of the bicyclist's feet and legs at high speeds. Another disadvantage is the generally upwards movement of the rear wheel and chainstays upon hitting a bump in the road. This occurs due to the relatively small difference in altitude between the joint where the chainstays are mounted to the main frame, and the rear hub. Upon making contact with the bump, the wheel will move upwards in an arc defined by the hinge. This is only desirable if the bumps are rather small, thus making contact very low on the wheel. These small bumps will propel the wheel slantingly upwards and backwards. The smaller the unevenness in the road, the more the force exerted on the wheel will be directed upwards. On the other hand, upon hitting a larger bump, the rear wheel movement will be considerably steeper than the steepness of the forces acting on the wheel. The angle between the ground and the direction in question will be close to 60 degrees. In the aforementioned construction, this will result in the shock being, to a considerable extent, transported to the bicyclist through the saddle, suspension system notwithstanding. This is the case for all related constructions, apart from those where the chainstays are joined to the main frame a considerable distance above the crankset, resulting in a better absorption of larger humps. This works rather well, provided no power is transmitted to the rear wheel. Should this occur, the contact location between the rear wheel and the surface will be displaced in relation to the bicyclist, as the horizontal component of the wheel's up-and-backwards movement will have to displace something, in this case the bicyclist on his/her saddle. For all practical purposes, this results in a compromise between displacement of the bicyclist and reduced suspension. (Provided the rear wheel is kept firmly on the ground, and does not start spinning.)

This effect will occur with all single-jointed constructions as the wheel will rotate to the same degree as the chainstays will rotate in relation to its joint with the main frame. This rotation will occur in addition to the existing rotation and propulsion of the rear wheel, and to the change of distance between the main mass (the bicyclist) and the wheels' point of contact with the ground, and will result in an attempt to accelerate the bicyclist in order for suspension to occur. This, however, involves a significant amount of energy, and the system as a whole is forced to compromise (provided this accelerations' increased demand for friction against the surface does not cause the rear wheel to lose its grip), by partly providing suspension, and partly lifting the bicyclist up.

Attempts have been made to solve this problem by mounting the chainstays to the main frame with a parallelogram-like contraption, rather than utilizing a single-jointed system. This works excellently as far as the aforementioned problem goes, as the wheel's orientation is held constant. The wheel's surface grip does not become subject to undesirable forces due to additional rotation. This structure type includes, together with single joint structures, constructions in which the drive gear is not isolated from the rest of the bicycle by being suspended entirely in the rear triangle. The drawback of this construction is the resulting variable distance between the topmost part of one of the (most commonly) three cogwheels of the crank set, and the upper quadrant of the corresponding cogwheel on the freewheel. This leads to a stretching of the chain, exerting power which in its turn saps the energy the bicyclist is utilizing to propel the vehicle forwards. This is the problem which bicycles with isolated power transmission try to eliminate. Furthermore, the wheel's direction immediately after impact with a bump on the surface remains unfavorable. Furthermore, should the suspension characteristics of any system be subject to a desired change, the only way to achieve this is by replacing the spring itself or, in some cases, taking the suspension unit completely apart and mounting it in a different position.

A general drawback and limitation that all full-suspension solutions presently suffer is a comparatively large amount of weight which remains unsuspended. Gears, cogwheels and chain are all forced to move simultaneously with the rear wheel, brakes and a rather heavy chainstays-construction. An ideal function such as bicycling over medium-sized bumps at high speed is not possible with this type of construction, for two reasons. Firstly, the chain and rear changer are forced to move with the wheel, making the chain rattle to and fro and provoke unexpected changes of gear. This situation admittedly rarely occurs, as friction in the suspension device is usually amply provided, drastically reducing the velocity of the rear wheel as it, along with the chain and rear changer, hits a bump in the road. Rather, the bicyclist again is forced to absorb the shock through the saddle, as excessive friction in the system prevents the spring in the springing mechanism from compressing, which is caused by the speed with which, for example, oil is pressed through a valve too high for the reciprocal power to provide sufficient suspension for the bicyclist. On so-called "downhill bicycles" various steering wheels are often mounted to prevent the chain from jumping off the cogwheels. The disadvantage of this, and related solutions, is the reduction of the number of gears by 66%.

Secondly, the suspension constant is not subject to change while in use. Certain constructions are equipped with the ability to "turn off" the suspension entirely by sealing off the valve oil in the suspension system. A gradual reduction of the suspension is also possible, resulting in an effect corresponding to installing a stiffer spring in the compression chamber of the system. However, this much friction or suppression prevents the rear wheel from returning to its intended position in time to absorb the shock from the next bump in the road (unless this is situated several meters away).

There are a number of existing prior art suspension designs for a bicycle front fork. The most common is the device with telescopic joint action in both fork legs. The prior art also comprises a design which is disclosed in U.S. Pat. No. 5,462,302, in which both legs of the fork are supported in a parallelogram which is oriented forward relative to a normal type of fork. Such a design will not provide any "anti-dive" feature. This means than under breaking, the suspension system is activated causing the front end of the bicycle to dive forwards and downwards. This is not desirable. The same construction is also known to break under pressure from the side. There also exist prior art variants having hinged double fork legs, such as U.S. Pat. No. 5,431,426, U.S. Pat. No. 4,421,337, DE-A-38 33 880 and DE-A-39 29 812, and also various single-legged fork constructions. A problem all these fork constructions have in common, is that it is imperative to take them apart, replace the springing medium with another one, such as a stiffer spring, to attain a satisfactory result based on the individual bicyclists weight and preferred cycling style.

The best-known designs normally have high friction under the transfer of forces to the springing medium. The prior art also includes various complicated linkage designs, often in connection with motorcycle forks. Examples are EP-A-30,306, 32,170 and 10, 426. These solutions will normally be poorly suited to bicycles.

From EP-A2-493,773, we are familiar with a suspension front fork in which a linkage arranged in a parallelogram form, with stays angled diagonally downwards and backwards while connected to a coil spring, results in a suspension and dampening mechanism. However, this mechanism, which is not very clearly described in the document, either provides too small a range of fork travel, or is structurally weak regarding torsional forces. In addition, it is unclear how the suspension means can work as intended. According to the publication it is furthermore dependent on a pipe which in a traditional manner goes down through the frame's front steering tube, mounted in the headset bearings, in order to provide a basis for a forkholding device for mounting of parallel bars. This applicant's Norwegian patent application number 1996 2355 concerns a solution with one central bar, two supporting bars and an enclosing structure. This solution requires a considerable amount of space under the fork crown in order to accommodate the middle central bar, as well as ample dimensions and weight for parts which are to absorb shock.

SUMMARY OF THE INVENTION

The following invention comprises a fully suspended bicycle frame which absorbs unevenness of reasonable dimensions at realistic speeds of off-road bicycling, far better than the constructions offered today. Furthermore, all suspension-related problems concerning the movement of the power transmission relative to the frame are entirely avoided, while simultaneously offering improved suspension as such. Additionally, adjustment of spring constant is infinitely variable with a simple knob or screw. Adjusting the spring constant can be performed while bicycling. The purpose of the invention is to present a light and solid construction of high durability, which needs only a limited amount of maintenance.

The main aspect of this invention is a frame with an isolated primary power transmission and an assembly with a secondary power transmission for transferring power to the driving wheel. Also included is a suspension, the assembly of which encompasses the components described in the following.

A frame with a hold component for holding a suspension mechanism and a drive gear on a projection or structure (chainstays) reaches, on one or both sides of the rear wheel, backwards towards the rear wheel's hub from an appropriate point on the frame. For all practical purposes, a normal freewheel or cogwheels are provided for gearing, but without a rear stop, they are mounted into one of the bearings on the movable midsection or to a hold on the main frame's rear structure or on the outside of the bearings on the rear section's one holding section linked to the main frame's rear section. Alternatively, they are mounted on one of the aforementioned bearing bolts, linked to the main frame's rear structure, resulting in a fixed distance during suspension, typical placing for freewheel, lower bar and lower mounting on the frame's rear and hub bearing without a rear stop mounted to the same bar as the freewheel.

A movable rear section includes one, two, three or more bars, somewhat parallel, pointing slopingly downwards, each mounted in revolvable bearings at both ends.

One or several suspension mechanisms are placed mainly in the movable midsection in order to create an upwardly-directed spring force towards the frame and the rider, where the suspension mechanism is equipped with a system for regulating the suspension mechanism's effective spring constant (spring stiffness). Also, torsion springs can be mounted around the bearing bolts, and the arms of the springs supply a counterforce by increasing or decreasing the angle between them. These can be combined with suspension springs as desired, to, for example, economize on space. Another type of additional suspension could be a rubber spring in order to achieve a progressive supplement to the main suspension, or to provide an optimal smoothness at the end of suspension movements when subjected to considerable challenges. The springing media compresses in a defined area of a lower bar, and springing media 25 placed in connection to a rear wheelholder in the ultimate sequence of maximum suspension release will provide the same spring constant regardless of the springing constant chosen for the main media. Mounting components for disc breaks on the rear wheel are also provided.

A preferred embodiment of the invention includes a suspension mechanism with a linearly functioning spring, of which at least one end is supplied with a device which can be adjusted transversely relative to the spring's linear direction. In this preferred embodiment, the linearly functioning spring's transversely adjustable device is ideally situated in a compartment placed next to the hub-supporting structure between the bars, as the springing mechanism's other end is mounted in the vicinity of the frame's rear section or in the movable end section's other end, either in connection to one of the bearings on the aforementioned or outside. The compartment can, of course, be mounted in any end of the movable rear section. The movable rear section with the spring and power transmission can be a part of the bicycle frame on just one side or on both sides of the bicycle's rear wheel.

In one embodiment, a pre-tensioning screw is preferably mounted for pre-adjustment of the spring, and a stopper device can be mounted to limit the upwards deflection caused by the pre-tensioning. In another desired embodiment, the spring mechanism (or mechanisms) on the movable rear section are supplied with known stoppers and end limiters of the spring deflection, pertaining to the telescopic movement of these components.

In an alternative embodiment of the invention, the spring mechanism includes at least one torsion spring placed around one of the bearings or another place where the arms meet counterforces, such as on the inside of the bars, and includes another counter-support in a suitable place. The torsion spring can be a permanent, unadjustable supplement to increase the spring constant by an arm engaging an adjustable extension on one or both bars.

In this second variant, the torsion spring with an adjustable effective spring constant can be positioned on the inside (beneath the upper bar).

There is a possibility, in this embodiment, to mount a counter-support for the torsion spring's (or springs') arms in such a way that the counter-supports can be removed from engagement upon the torsion spring by pulling a wire by way of a lever on the handlebars, in order to increase the spring constant should this be deemed necessary.

In the alternative embodiments of the invention, a pre-stressing screw can be placed for advance tightening of an arm on the torsion spring, and a stopper can be placed to limit the upwards deflection caused by the prestressing (biasing).

In a third alternative embodiment, pre-tension (biasing) could be achieved by reducing the torsion spring's arms by tightening a threaded part mounted on a sheath with a guide for the spring arms on the inside of one of the top or bottom of the parallelogram bars.

In any of the embodiments, the suspension mechanisms can include at least one additional torsion spring mounted around one of the bearings to provide a larger total spring constant. For the sake of economizing on space, a combination of these possibilities can also be considered.

The front assembly of this invention presents none of the previously mentioned disadvantages, and is created for use on any bicycle (or two-wheeled vehicle). The suspension mechanism can be precisely monitored and adjusted by a hex key or knob. Too high or too low pre-tension is thus avoided, as are complicated procedures for replacement of springs. Using a wide and torsion-resistant bar, the number of components in the setup is drastically reduced, along with production costs. Furthermore, a flat tire can be repaired without removing the wheel from the bicycle. Thanks to the cost-efficiency of an asymmetrical construction, the possibility arises of using durable ballbearings without making the construction too heavy.

Another aspect of the invention is thus related to the mounting of a suspended front fork of the asymmetrical type, for use on a standard steering tube. Mounting involves a frontal fastening board which can be mounted to the steering tube with revolvable bearings on the top and bottom of the steering tube. On the side of the fastening board is either a downwards-facing fastening part for a bar and suspension mechanism in which, for example, the wheel is fastened in a pipe which juts outward and downward from the suspension mechanism, or a longer, downwardfacing fastening part shaped as a pipe in which the bar and suspension mechanism are mounted at the extremity, and where for example, the wheel's hub is integrated as part of the suspension mechanism. By placing the suspension mechanism between these points, a combination of the pipe and fastening parts is a possibility. In both cases, at least one of the bars is slanted downwards and backwards, relatively broad and torsion-free. The configuration can make up a parallelogram to keep the orientation of the wheels or disc brake pads constant independent of braking. The direction of the bars, and the fact that the orientation of the wheel can be upheld or altered as one wishes, gives the set-up an anti-dive function. The construction, correspondingly, is made up of at least one torsion-free bar and if desirable, additional bars to maintain the wheels' orientation or to increase torsion rigidity. The bar or bars are pivotably mounted at both ends and have a predominantly different length with a suspension mechanism placed in such a fashion that the suspension system will alter the distance between the suspension system's anchorage points. These will either approach each other, or they will go in opposite directions, allowing suspension power in a springing medium to be utilized for absorbing a bump. In those cases in which an additional bridge has been fastened to the fork pipe for mounting standard (non-disc) brakes, more than one bar will not be necessary as the forkpipe itself guarantees satisfactory orienteering of the wheel and the brake pads which operate on the wheel's rim. This only applies, of course, in those cases where the suspension mechanism is placed above the brakes' mounting points. An advantage of placing the suspension mechanism low on the wheel is the increased prospect of acquiring an antidive-effect through the correct position and length of the bar which defines the relationship to the disc brake pinching device and how it affects the brake disc. Antidive can also be acquired by positioning the suspension mechanism higher up.

The mounting of the fork, according to this invention, is recognized by having one leg only. At least one broad bar is mounted on horizontal axle pins on the fastening part, and fastened to a fastening part on fastening boards for the forks steering pipe (FIG. 1 is known from standard forks), or fastened to an external structure (FIG. 2 known from Norwegian patent application number 1996 2355) on its fastening part on one side of the bicycle's front wheel. The bars comprise at least one broad bar mounted on one side of the bicycle's front wheel, respectively revolvable and in pairs on horizontal shafts or axle pins in the rear fastening structure for the parallelogram-bars. The width and mounting of a relatively large bar results in a torsion-rigid structure.

A suspension mechanism is mounted in such a way that the movements of the suspension system will alter the distance between the suspension mechanisms anchorage points, which move towards, or apart from, each other. In this way, suspension power in a suspension medium can be utilized for absorbing bumps, and the suspension mechanism includes a linearly functioning spring in which at least one end of the spring is fitted with a device which can be altered relative to the spring's linear direction. By turning a hex key or a similar tool, at its fixed base, rotation will cause a displacement of the transverse bolt to which one end of the spring mechanism is attached. The displacement of the transverse bolt in relation to the same extremity's rear fastening points for parallelogram-bars will alter the suspension characteristics in the suspension mechanism as the difference in the distance between minimum and maximum deflection of the transverse bolt's position will be subject to corresponding travel of the fork. Yet another suspension medium has been added at a suitable position for compression of a defined area, and independently adjusted to provide a progressive and smooth rounding-off when the system is exposed to large bumps.

Adjusting suspension characteristics has long been a problem. Most systems involve a more or less intricate oil-based dampening mechanism, as well as the option for altering bias and suspension characteristics by replacing the suspension medium.

This problem is solved in this invention, as the spring compression can be altered to adjust the suspension characteristics to a desired resistance pr. mm. suspension. This is achieved by transposing the placement of one end of the suspension mechanism along a slot placed between the bearings' mounting holes in a slotted compartment, placed in a direction which is mainly perpendicular to the suspension mechanism's horizontal axis, as seen in an unloaded state. As the parallelograms swing upwards and backwards during loading, the difference between the suspension mechanism's upper anchorage point and any other placement of the suspension mechanisms other end along the slot will have a desired difference corresponding to the same movement of the suspension system. Furthermore, an adjustment knob is placed on the suspension mechanism.

It is often attempted to dampen undesirable rocking movements by supplying the movable parts with friction against each other somewhere and to a controllable degree. The submitted invention has solved this by utilizing the possibility for precise adjustment of the suspension mechanism in such a way that the counterforces in the spring do not surpass the counterforces represented by the bicyclist and the bicycle, while simultaneously minimizing friction and providing a favourable direction of the wheel at the initiation of each movement. Together, these characteristics ensure that virtually no movement is transplanted to the handlebars, which provides the bicyclist with an upwards thrust. Accordingly, there will be no mass in need of suspension. This applies to most situations at most speeds. In certain occasions, where bumps and velocity demand a stronger spring for shock absorption, a supplementary suspension medium has been included in addition to the main medium. At low speeds, low weight, and simple manuvering, no additional friction to the suspension system is required. Quite the contrary, as long as the spring is soft enough and the speed and weight are low enough, no movement will propagate through the handlebars. Should this occur, no suspension is needed anyway, as there is no mass in movement. For this reason, no dampening mechanism is included in the present embodiment.

BRIEF DESCRIPTION OF THE DRAWINGS

The invention is described more closely in a detailed description of enclosed drawings in which.

DETAILED DESCRIPTION OF THE INVENTION

Figure 1:
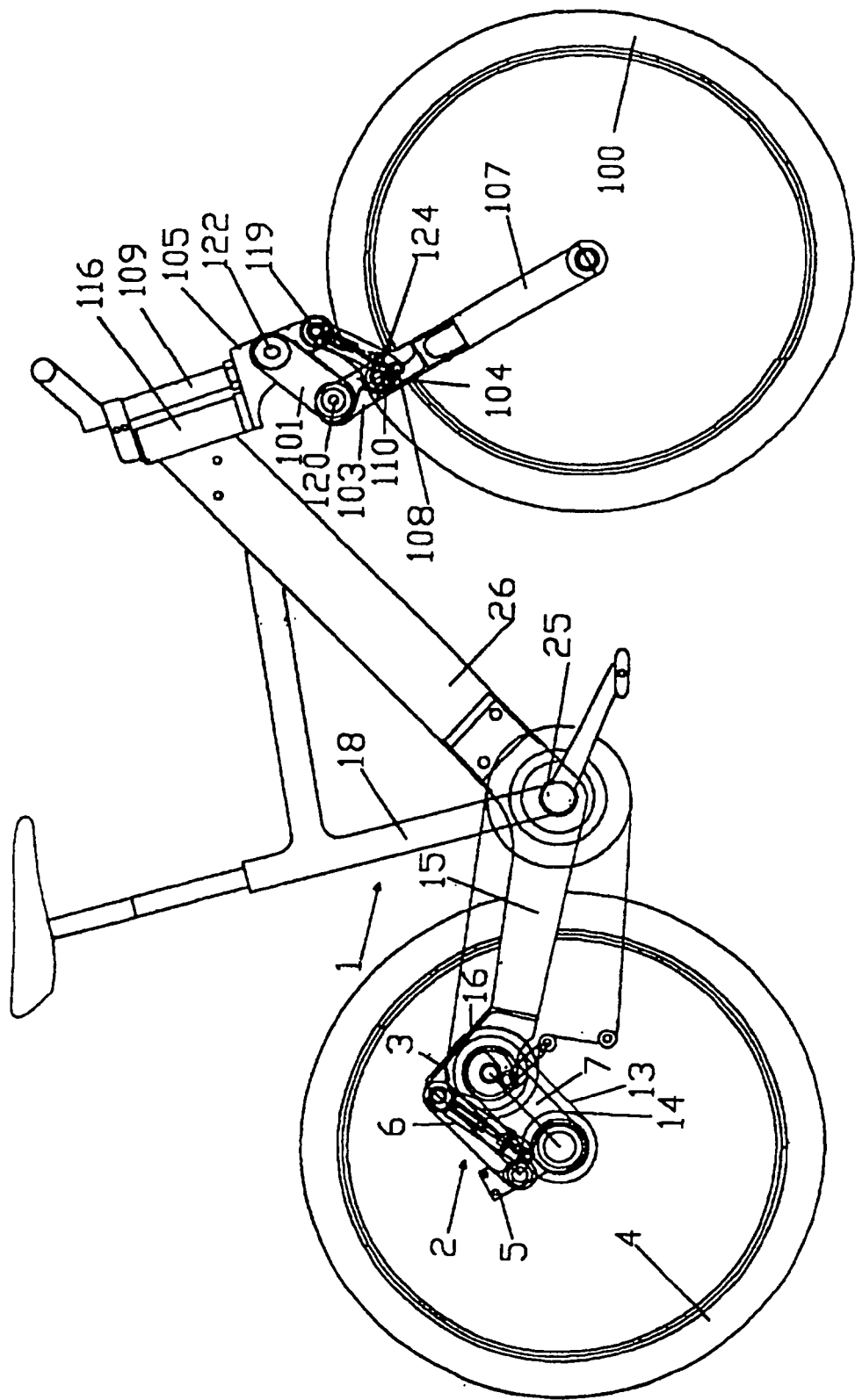
FIG. 1. is a side view of a bicycle with chainstays and a fork in accordance with a preferred embodiment.
Figure 2:
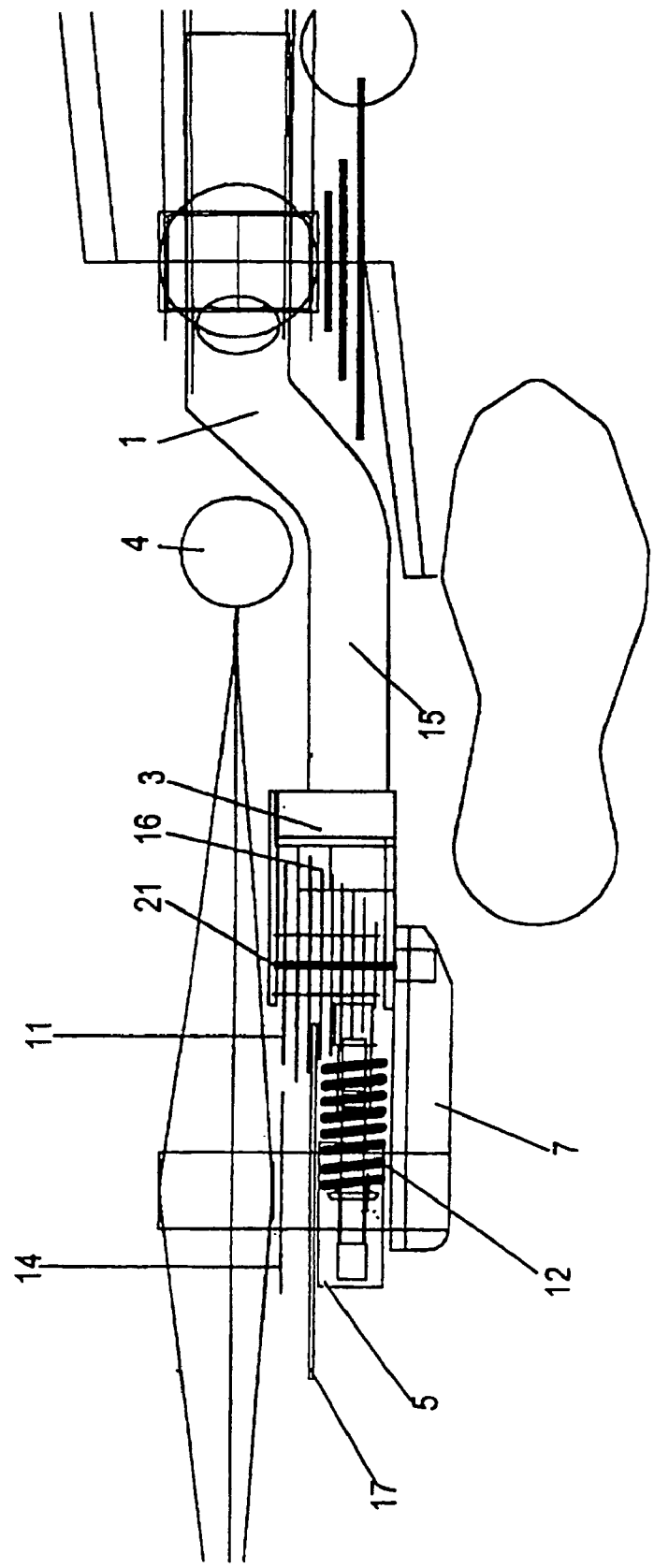
FIG. 2. is a plan view of the rear portion of the bicycle in FIG. 1, enlarged to show important details.
Figure 3:
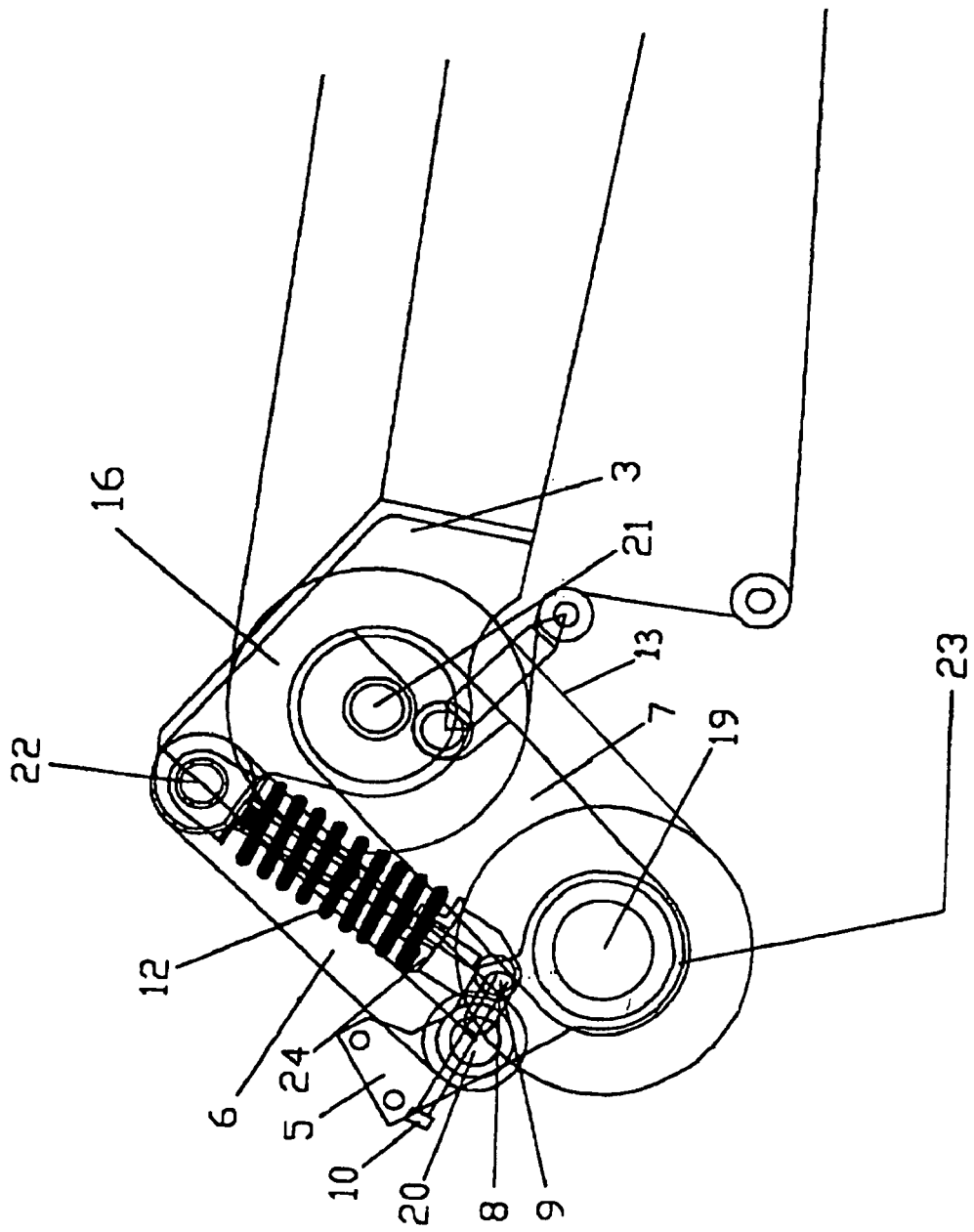
FIG. 3. is an enlarged detail view of the suspension system for a rear wheel, as shown in FIG. 1.

FIGS. 1–3 show a preferred embodiment of one aspect of the invention. A rear frame construction 2 includes a lower wheelholder 5 for rear wheel 4, rear fastening part 3 attached to a main frame 1, one movable midsection formed of bars 6, 7, between wheel holder 5 and fastening part 3, and the frame itself 1 for supporting the remaining parts which together comprise a bicycle (i.e., a two-wheeled vehicle). As shown in FIG. 1, the main frame 1 includes chainstays 15, saddle tube 18, crank housing 25, and a lower tube 26 connecting the crank housing 25 to steering tube 116.

Rear fastening part 3 should be mounted on the chainstays (chain fork) 15 of the main frame 1, and they strengthen the chainstays 15 with mounting details because the rear fastening part 3 has holes for threaded inserts for the fastening of bearing bolts 21, 22 as well as threaded parts for mounting of gears. Fastening part 3 forms a rigid extension of chainstays 15.

The bicycle's rear wheel 4 is mounted on the lower wheelholder 5 with either the bearing bolt 19 or 20, or is fastened to bolt 19 or 20, and wheelholder 5 forms a rigid extension of movable midsection including torsion-rigid bars 6, 7. Rear fastening part 3 and lower wheelholder 5 have been designed so that bearing bolts with cogs or bars can be screwed directly into this structure from the side.

Between rear fastening part 3 and rear wheelholder 5 is the movable midsection made up of the two mainly parallel bars 6, 7 of predominantly equal length, and one or several suspension mechanisms which eventually can comprise a dampening unit. The upper bar 6 is fastened at each end by upper bearing pins 22, 20 to rear fastening part 3 and lower wheelholder 5, respectively. A suspension unit, such as a spring 12, has been fastened to bearing bolts 22 and 19 on rear fastening part 3 and lower wheelholder 5, respectively. In FIG. 3, however, an adjustable mounting on bearing 19 (i.e., the spring 12 itself) is described in further detail below.

The mainly parallel bars 6, 7 can pivot around bearing bolts 19, 20, 21, 22 (as applicable) and if the center distance between the bearing bolts along each of bars 6, 7 is identical, or if in addition the distance between the center points of the bearing pins on rear fastening part 3 and lower wheelholder 5 is the same, the movement of the movable midsection (bars 6,7) will be "parallelogram movement" (i.e., the bars 6,7, the rear fastening part 3, the lower wheelholder 5 and bearing bolts 19, 20, 21, 22 form a parallelogram-shaped suspension assembly). In other words, lower wheelholder 5 will maintain its orientation during movement in the suspension, so that no additional rotation of the wheel which could affect the power transmission in an unfavourable way during bicycling over bumps will occur.

The bars can have somewhat different lengths, and the distance between them can also be dissimilar. This might cause a relative backwards rotation of the wheel, which affects the horizontal, backwards-turned distance component which occurs as the movable midsection moves during suspension-related movements, and can be compensated for by a length corresponding to the backwards rotation. (Cases such as this one, in which a slight deviation from a perfect parallelogram structure occurs, are nonetheless included when "parallelogram movement" is mentioned.)

Furthermore, a preferred embodiment includes a main frame with chainstays 15 only on one side (i.e., an asymmetrical construction as shown in FIG. 2). However, a more traditional embodiment with traditional chainstays is also possible. For the sake of clarity, certain details have been omitted in FIG. 2.

A great advantage of the preferred embodiment with asymmetrical chainstays 15 and adherent powerfully dimensioned bearing bolts 19–22 in the suspension device 2, is the easy access to the rear wheel from the other side where fork constructions would be an impediment. For this reason, the desirable type of brakes would not be the traditional "scissor-kind", and lower wheelholder 5 is accordingly equipped with disc brakes. In FIG. 2, the brake disk 17 is rigidly mounted to the same rotating axle as the wheel. In other words, brake disc 17 rotates together with the wheel. On the lower wheelholder 5 is an extension (not shown) with brake pads which can grip a part of brake disc 17. The pads are manipulated in the customary fashion, through brake levers on the handlebars.

As one can see, wheel 4, or the tire on the wheel rim, can be handled directly from the "open" side, (i.e., the side without rear frame 2) and can be removed/changed without having to remove or manipulate other parts. Changing wheels and tires can thus be performed with little time or hassle. The wheel can be held firmly in its place on the axle with a snap-lock device (not shown).

An important aspect of the invention is the rear fastening part 3, where a, for all practical purposes, normal freewheel 16 has been mounted. A normal chain runs through this freewheel, and a change of gears occurs in a normal fashion. The freewheel 16, however, is without a "rear block" (i.e., it rotates freely in both directions). The freewheel 16 also has a first cogwheel 11, in FIG. 2 shown closest to the wheel 4. This first cogwheel 11 is connected to second cogwheel 14 by a secondary chain 13 which is only shown in FIG. 1. Second cogwheel 14 is the driving cogwheel for the rear wheels, and has a rear block to make up for the missing rear block on the freewheel 16.

The freewheel 16 will typically be found between the extreme width-wise points of the lower or upper bars 6, 7, or in association with one of the bearings on upper or lower bar 6, 7, or on a separate bearing bolt on this part and correspondingly on the lower wheelholder 5. An indent can be provided to make a place for the cogwheels to rotate. It is of utmost importance that the bearing pins/bolts for mounting the secondary chain 13, which might be placed on the outside of the bearing bolts for rotation of the midsection as a whole, have the same distance in relation to the bearing pairs on the section, so no change of distance occurs during suspension which would cause a change of the chains distance and thus pedalfeedback. The suspension mechanism may also have additional torsion springs around one of the bearing bolts with a construction on the holding section and, for example, one of the parallelogram bars. An embodiment of the invention can also have several torsion springs around several or all of the four bearing bolts 19–22. Each torsion spring may engage a counter-support which can be shoved in and out by using a lever on the handlebars in order for an increased suspension constant to be added to the system with a simple movement of a lever in demanding circumstances, such as steep downhill runs.

The suspension mechanism shown in FIGS. 2 and 3 is conceived as a compression spring 12. An extension spring, however, or other suspension medias can also be utilized. This type of spring is also suitable for being installed in the compartment for adjusting the system suspension stiffness.

Bearing bolts 19–22 are predominantly equipped with threaded flanges to keep bars 6, 7 in place. The bearing bolts' rather substantial diameter makes them resistant to development of play. In addition, ample space is allowed for ball bearings, should these be desired. (The broad line in FIG. 2 only pertains to the central axis of bearing pin 21, whose diameter is as indicated on both sides.)

Another important aspect of the invention can be witnessed in FIG. 3 in which, a suspension mechanism with an adjustment device for adjusting the effective spring constant for the system as a whole is shown. The suspension mechanism and its central components can be fitted between one or several points which either approach each other, or separate from each other as the system moves in one direction. For example, fixed points on bars 6, 7 or a point on upper bar 6 and another one on lower wheelholder 5, or a projection of one of the holding parts or the bars fitted for this purpose. This is something completely different than the pretensioner (i.e., pretensioning wheel) 24, whose only purpose is to make sure spring 12 works in an area outside of its relaxed position. In connection with the suspension mechanism's lower terminating hold 9, a slot 8 has been provided for changing the position of one of the spring's ends, through a mainly transversal shift relative to the suspension mechanism's (i.e., spring's) general direction. Instead of one slot 8, one two slots might be provided, including one in each end of the suspension mechanism. One might, of course, also have two or more holes to which one or both of the suspension mechanism's terminal grips could be fastened. By doing this, one alters the spring stroke length during a compression of the system as a whole. In this way, the spring will be pressed more or less together with the same deflection as the system as a whole. The spring constant (spring stiffness) relative to the system as a whole will thus be altered to the extent one adjusts the grip (or grips) of the spring mechanism in slot 8 with adjusting knob (adjusting device) 10 or a similar device. This adjustment mechanism can either be a part of the rear wheelholder 5, or a separate cartridge/compartment with optional functions like change of bias, for attachment to one of the bearing bolts of the rear wheelholder 5, or other suitable mounting arrangements.

Whether one prefers spring mechanism 12 with an independently adjustable pre-tension with a separate pre-tensioning wheel 24 or not, an embodiment of the invention may have adjustable pre-tension by allowing the compartment part to be swung around one of the bearing bolts 19–22 on the rear fastening part 3 or lower wheelholder 5. One could also imagine a different arrangement in which a device is placed in a suitable spot for the adjusting knob's counter support. In this way, it would be possible to change pretension by swinging the entire compartment around a bearing bolt, such as bearing bolt 19, provided a fixation stopper is provided for parallelogram bars 6,7, such as an elongation of the compartment towards the grip of bars 6,7. The pre-tension can also be altered as the suspension mechanism is equipped with the revolvable pre-tensioning wheel 24 which compresses spring 12 while at the same time the angle of the parallelogram bars are kept intact by a counter-support inside the suspension mechanism which prevents the distance between the suspension mechanisms end points from increasing.

By introducing a corresponding compartment cartridge for regulating the other end of the suspension mechanism, one has provided as many possibilities for individual adjustment as are feasible. The suspension mechanism's and the compartment's location can be outside the movable midsection's limitations, wherever two points move towards each other or apart during suspension of the system, to give space for a spring which is as long as possible. Furthermore, one may mount a suspension mechanism based on the compression of air, where the system's spring constant is regulated by the pressure of the pneumatic springs. A combination of the systems is, of course, also possible, such as a combination of systems for regulating the stiffness of the pneumatic spring by altering, as described above, the relationship between the system's movement and the deflection affecting the spring.

As mentioned above, the hub cogwheel 11 for the rear wheel 4 is equipped with a rear stop (instead of the freewheel 16). In addition a rear stop 23 on the longer wheelholder 5 is of importance. These two rear stops prevent rotation in diametrical directions. The rear hub is tightened during power transmission, the bearing grips the hub, which in turn is connected to the wheel's contact point. One can therefore both pedal backwards or refrain from pedalling.

In the case of lower wheelholder 5, the rear stop 23 will rotate the hub's cogwheel 11 (with its hubstop) some degrees backwards, thus altering the orientation of the wheel somewhat, and preventing the wheel's contact point with the surface to change horizontally relative to the main mass of the bicycle and rider. What happens here is a compensation for the extension of a slanted arm as it is straightened backwards, changing the point of engagement of the wheel, thereby trying to thrust the bicyclist in a forward direction. This situation is consequently prevented, and in a practical case this is of great importance.

Figure 8:
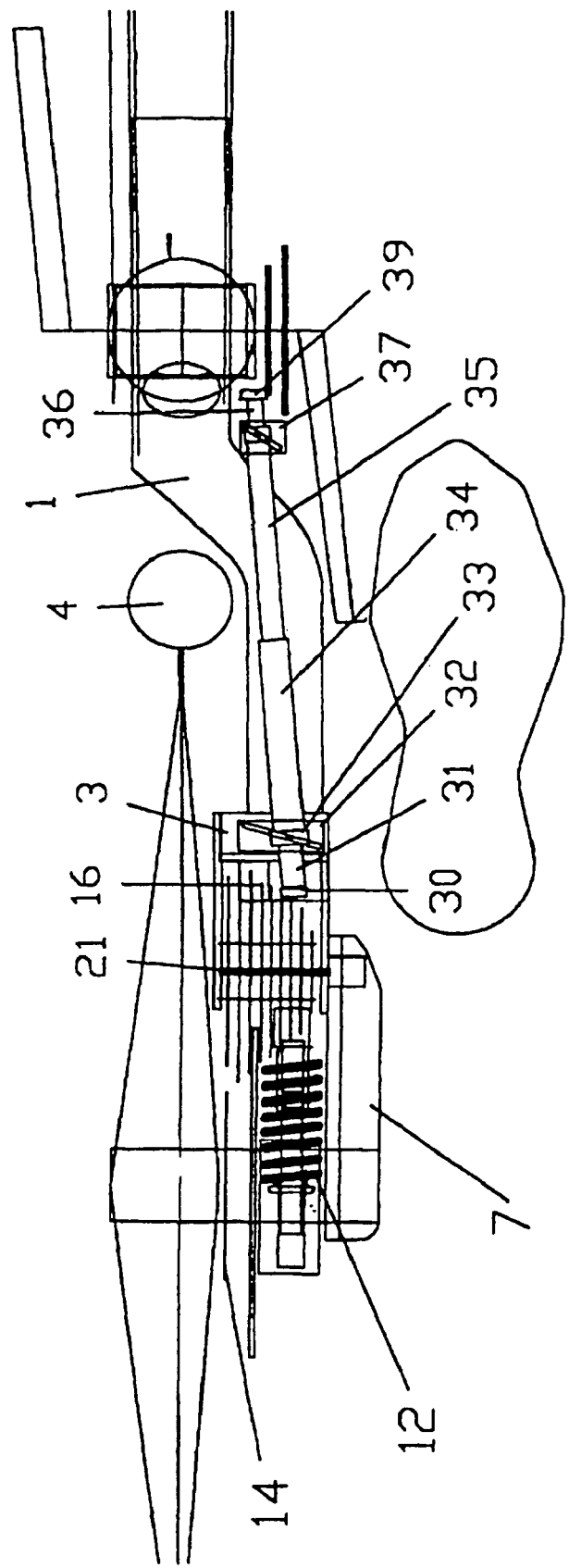
FIG. 8. is a plan view similar to FIG. 2, in which power transmission by chain has been replaced by gimbals.

In another aspect of the invention, the normal chain between the vehicle crank set and rear freewheel 16 is replaced with a cardan transmission mechanism including gimbals. This is demonstrated in FIG. 8. As shown in the mechanism includes a rear cogwheel 30 on the gimbal sheaths 34, 35, a shaft 31, and a holder 32 having a guide bar for gearing. The mechanism further includes a holder 33 having a pin for the guide bar, a gimbal shaft 36, is another holder 37 with a guide bar for gearing, yet another holder 38 with a pin for the guide bar, and is a second cogwheel 39, situated by the gimbal front end.

To change gears, the gimbals pull cogwheel 30 or 39 out of mesh with freewheel 16 or a cogwheel on the crank set, shuffling to a larger or smaller cogwheel on the freewheel or on the crank set. Thereafter, a spring is released which forces the gimbals' cogwheel to mesh with the selected gear. To achieve this, the gimbal shaft is elongated during gearshifts, and has a different length depending on the chosen gear. For this reason, the gimbal shaft is split in two halves, each with the profile of a half moon. Between these there is a roller bearing, which makes it possible to shift length while transmitting power. One end of the gimbals can be joined directly to a freewheel on the hub or, as shown, to the freewheel 16, with power transmission by way of a chain 11 from the freewheel 16 to the hub cogwheel 14. The advantages of using gimbals is a simplification of the gear system, less maintenance, less mess, and there is no chain which can jump off the cogwheels.

By placing the rear cogwheels of the gimbals towards a selected cogwheel and gear in the same way a chain is applied today, a minimum number of cogwheels are in contact with each other, thus minimizing friction, which is the point of this solution. All other gimbal-based solutions result in higher friction.

Figure 4:
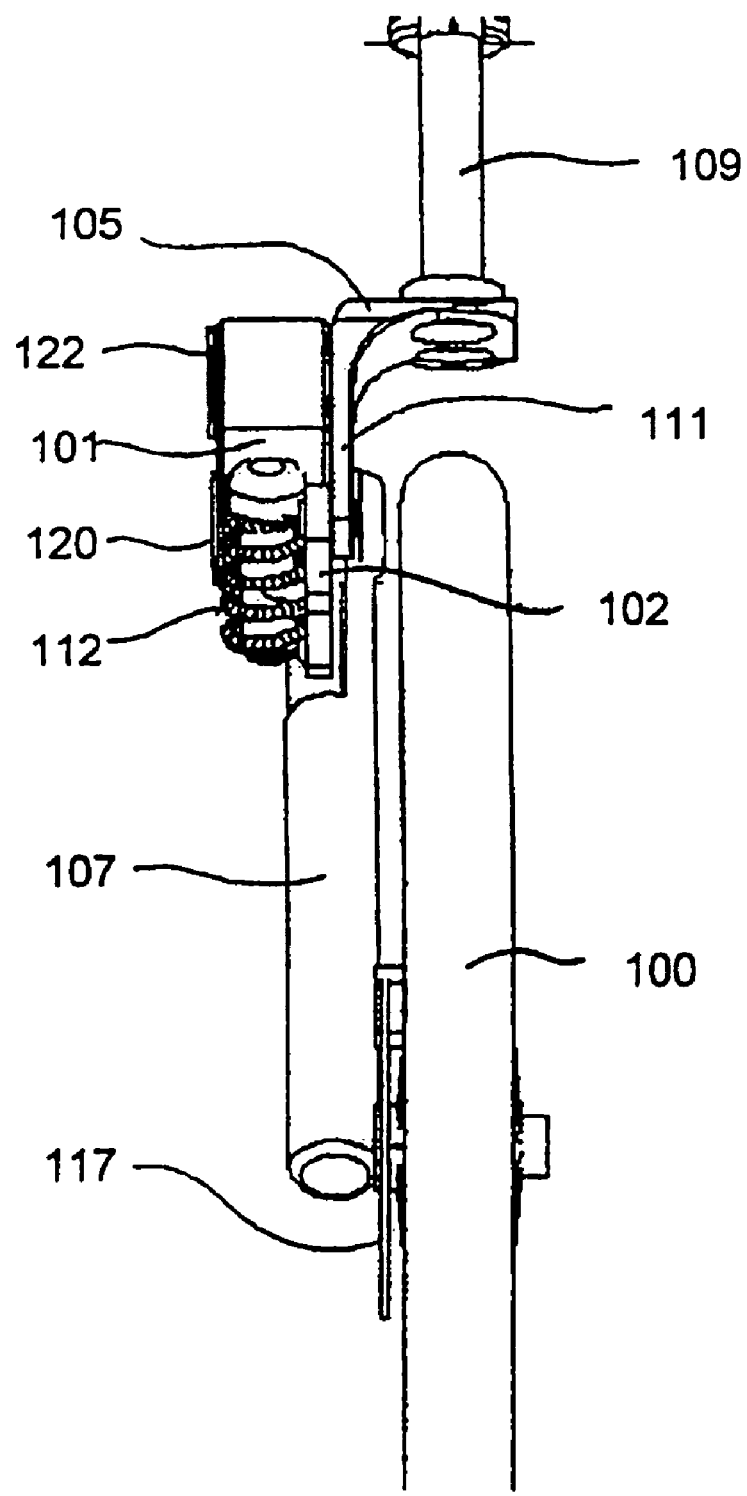
FIG. 4. is a front view of a one-sided front fork in accordance with one embodiment of the invention.
Figure 5:
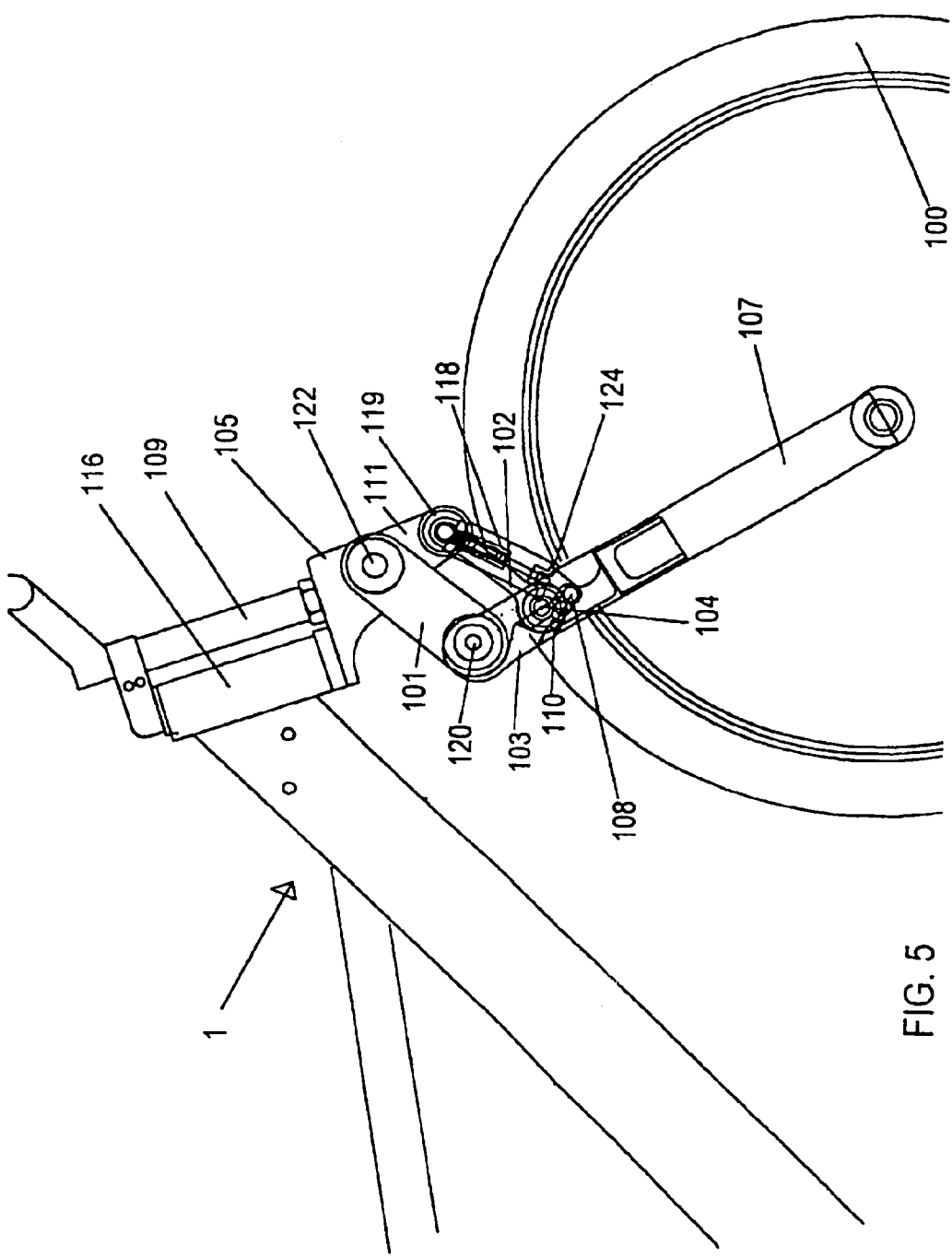
FIG. 5. is a side view of a suspension mechanism for the front fork in accordance with one embodiment of the invention.

Another aspect of the frame construction is the fork which can be seen in FIG. 1, mainly on the right hand, and also FIGS. 4 and 5. (FIG. 5 illustrates the same portion as FIG. 1, but enlarged.)

The most important characteristic of the fork is that it is one-sided, but it will still offer suspension.

FIG. 5 shows the fork separately, in profile, and the various details which are included will be discussed from top to bottom. This figure shows a frontal piece 109 and steering tube 116, and a headset fastened either to an extension (not shown) of the frontal piece 109, or to a standard, extended inner steering tube which extends above the bicycle's steering tube assembly. A fastening piece 105 has a downwards protruding section 111 on the side of the bicycle front wheel 100, and two bars 101, 102, at least one of which is broad and strong, are pivotably mounted on horizontal shaft pins 120, 104 on a support 103 for the fork leg 107. The support can be part of a piece mounted to the fork leg 107, or an integrated part thereof. The width and mounting of a comparatively large bar 101 provides a torsion-rigid construction.

FIG. 4 shows a fastening piece 105 with a downwards protruding section 111. The movable pair of bars 101, 102 are shown mainly on the outside of the fastening piece 105. An external structure, encompassing the exterior of the two bars, is also a possibility.

Both bars 101, 102 point downwards and backwards from the mounting-point in the downwards protruding section of the fastening piece, and relative to the bicycle's forward direction. Upper and lower bars preferably have different lengths so that the lower bar 102 may be somewhat shorter than bar 101. Lower bar 102 is preferably placed more or less on the same level as the front wheel tire.

The upper, frontmost bearing pin 122 for the upper bar 101 may be fastened to the downwards protruding section with, for example, a threaded unit in one end for mounting in a correspondingly threaded hole in section 111.

Another important aspect of the invention is a suspension mechanism with a system for adjusting the effective spring constant for the system as a whole. The suspension mechanism and its central components (in particular spiral spring 112) may be placed between two points which either approach each other or move apart as the system moves, for example, fixed points on section 111 and support 103, or a point on upper bar 101 and another point on rear support 103, or a projection on section 111, support 103 or bars 101, 102. This is something completely different from the pre-tensioning of spring 112, which can be effected, for example, with a pre-tensioning wheel 24, whose only function is to make spring 112 work in an area outside of its relaxed position. (Spring 112 is not shown in FIGS. 1 and 5, but is placed next to part 124 on the outside of the steering and stopping device 118.) A slot 108 has been placed in connection with the suspension mechanism's lower fastening point, and has a mainly transversal displacement with regard to the suspension mechanism's general direction. Instead of one slot, two slots might be included, including one in each end of the suspension mechanism. One might, of course, also have two or more holes where one or both of the suspension mechanism fastening points may be mounted. In this way, the stroke length of spring 112 may be adjusted by a given compression of the system in its entirety. Thus, the spring is pressed more or less together with the same deflection for the system all in all. The spring stiffness/ constant relative to the system as a whole will thus be altered depending on how one chooses to adjust one (or several) fastening points for the suspension mechanism in slot 108 with an adjusting knob 110 or similar. This mechanism for adjustment can either be a part of support 103, or can be stored in a separate cartridge or compartment 106 (see FIG. 6), conceivably with additional functions such as adjustment of the pre-tension, can be fastened to one of the bearing bolts 120, 104 or other appropriate fastening arrangements.

Figure 6:
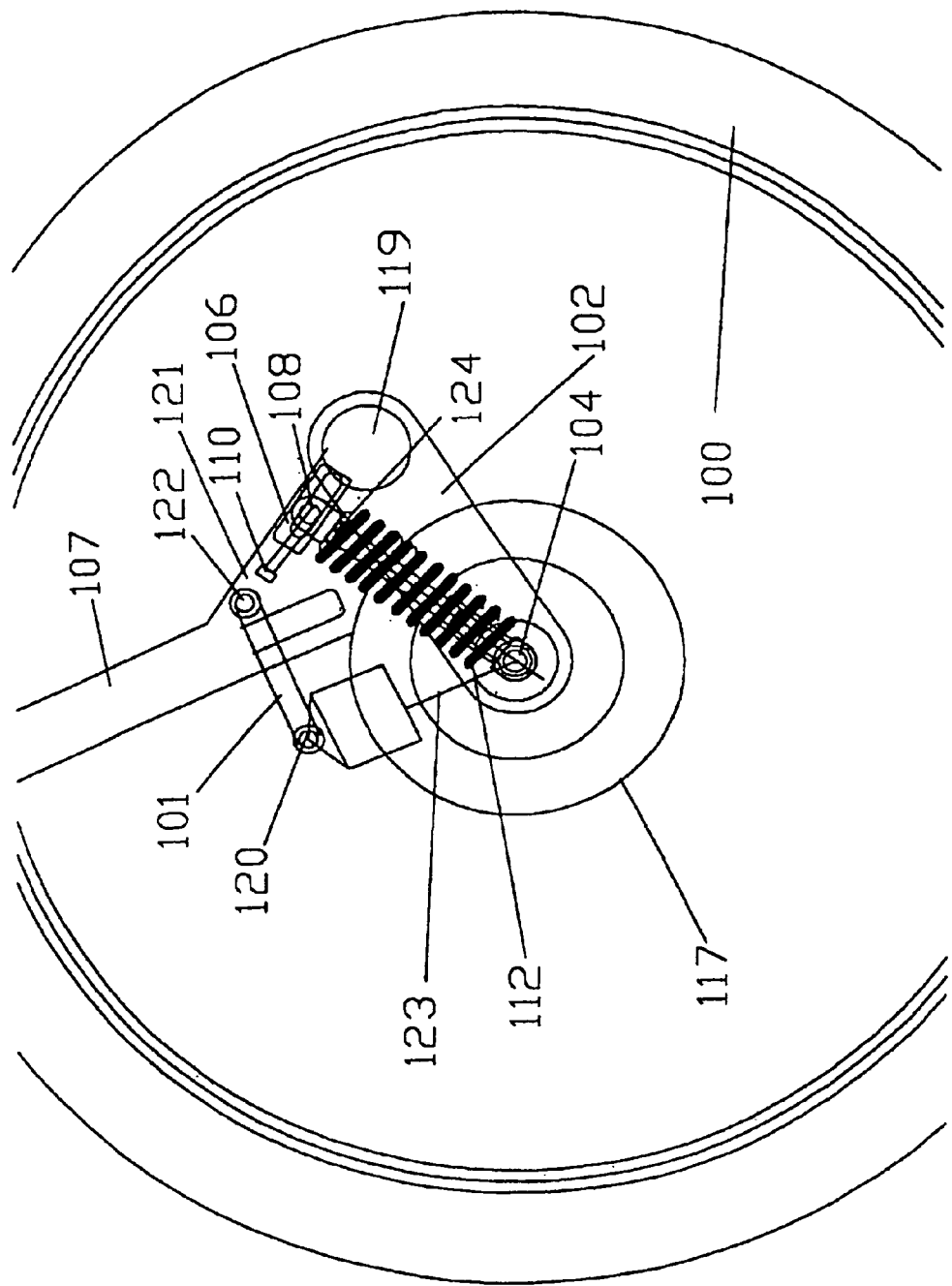
FIG. 6. is a side view of an alternative embodiment of a front fork suspension mechanism.

Whether one desires a suspension mechanism with independently adjustable bias with a separate pre-tensioning wheel 124 or not, one embodiment of the invention may provide an adjustable pre-tension by rivoting compartment 106 around one of the mounted bearing bolts, in FIG. 6 bearing 119 provided a fixation stopper exists for the parallelogram arms, such as an extension of the compartment meeting the ceiling in one of the bars 101, 102. The bias may also, as mentioned, be altered by equipping the spring mechanism with a revolvable pre-tensioning wheel 124, which presses the spring 112 together while simultaneously retaining the angle of the parallelogram bars 101, 102, allowing a counter-support inside the suspension mechanism to prevent the distance between the suspension mechanism's end points from increasing.

In FIG. 4, reference numeral 117 pertains to a braking disc. A disc brake is an advantage here, as with the rear wheel.

FIG. 6 shows another variation of the suspended front fork of the invention. Specifically, it shows a version in which the suspension mechanism has been moved to a position closer to the front wheel hub, such as at the bottom end of the fork leg 107. In this embodiment, the lower bar 102 is wide strong (which is better to take up torsion forces) while the upper bar 101 is slimmer. The fork leg 107 tapers out to part 121, and bars 101, 102 are journalled between this tapering part 121 and a wheelholding unit 123 (analogous to support 103 for the fork leg in the variant with the suspension mechanism placed higher up.)

The top part of the fork leg (not shown in FIG. 6) appears to be rather normal, apart from its one-sided shoulder/crown beneath the frame's steering tube.

The function of the suspension mechanism placed low on the wheel is analogous to the first variant, also concerning the adjustment of spring stiffness by the aid of an adjusting knob 110 for transverse displacement of the end attachment for the suspension mechanism (spring 112) in slot 108 in a compartment 106 (which might eventually also supply the possibility of adjustment of pre-tension as described above). Note that in the shown embodiments, the parallelogram configuration deviates to some extent from a perfect parallelogram, as the length of bars 101, 102 are different. In the shown example the bars are, for this reason, only roughly parallel.

Figure 7:
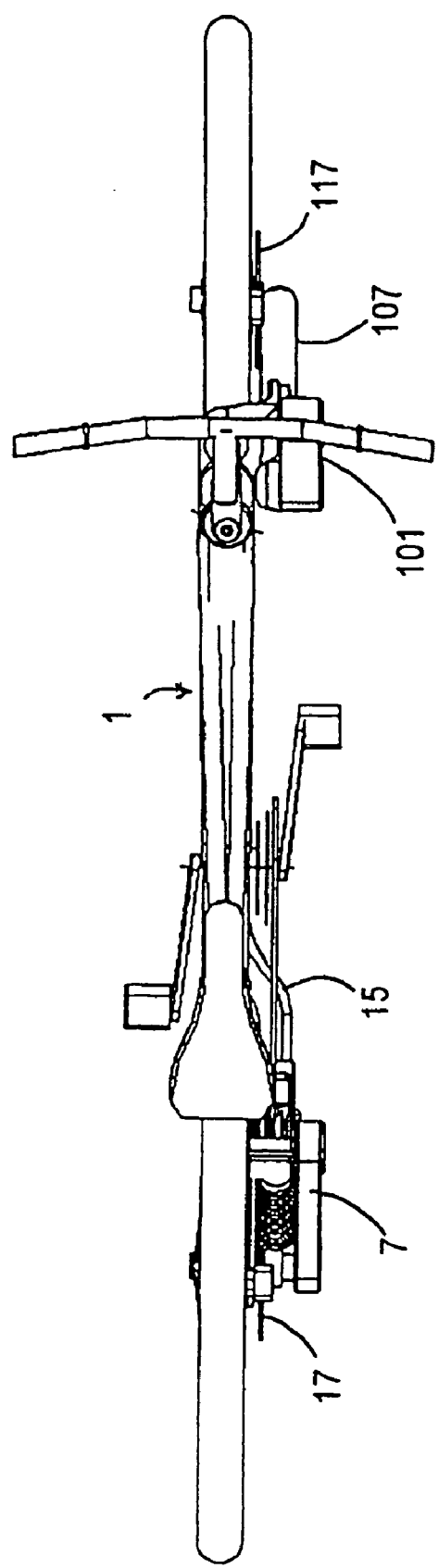
FIG. 7. is a plan view of a bicycle with a one-ended fork embodiment in front as well as at the rear.

FIG. 7 shows a complete, one-sided (asymmetrical) bicycle in accordance with important aspects of the invention, seen from above. Note the one-sided fork and chainstays 15 and 107, and brake discs 17 and 117.

The various aspects of the invention may be combined, or implemented to varying degrees, on a bicycle. The preferred version is entirely one-sided and has a parallelogram suspension with an adjustable spring constant on both front and rear end of the bicycle, but one-sidedness on either of the ends is sufficient. Furthermore, a parallelogram-type suspension with an adjustable spring constant on either the front or rear of the bicycle is also sufficient. (Regarding the chainstays, adjustability is not a necessary feature.)

Only a human-powered bicycle has been described herein, but some possible embodiments are feasible for motorcycles, and the invention concerns two-wheeled vehicles in general.

The invention has been described above using, in a non-restricting manner. The scope of the invention shall only be subject to the limitations of the enclosed claims and equivalents of these.

What is claimed is:

1. A frame assembly for a two-wheeled vehicle, comprising:
   a front wheel fork;
   a main frame attached to said front wheel fork, said main frame including chainstays; and
   a parallelogram-shaped suspension system attached to a rear end of said chainstays of said main frame, said parallelogram-shaped suspension system including:
   a rear fastening part attached to said rear end of said chainstays, said rear fastening part having a first pair of bearing bolts;
   a wheelholder for holding a rear wheel of the two-wheeled vehicle, said wheelholder having a second pair of bearing bolts;
   a first bar having a first end pivotably connected to a first one of said first pair of bearing bolts and having a second end pivotably connected to a first one of said second pair of bearing bolts;
   a second bar having a first end pivotably connected to a second one of said first pair of bearing bolts and having a second end pivotably connected to a second one of said second pair of bearing bolts, said first bar and said second bar having substantially equal lengths and being arranged substantially parallel, said first bar and said second bar being arranged so as to extend at a downward incline from said rear fastening part towards a rear of said frame assembly;
   a spring device between said rear fastening part and said wheelholder so as to extend downward toward an axle of the rear wheel to thereby generate a spring force; and
   a power transmission device for transmitting power from a first cogwheel mounted to said rear fastening part to a second cogwheel mounted to the rear wheel.

2. The frame assembly of claim 1, wherein said spring device includes a pre-tensioning wheel operable to adjust a compression of a spring of said spring device so as to adjust a pre-tension of said spring.

3. The frame assembly of claim 1, wherein said power transmission device comprises a chain linking said first cogwheel and said second cogwheel, said parallelogram-shaped suspension system further including a freewheel mounted to said rear fastening part, said freewheel comprising a plurality of cogwheels including said first cogwheel.

4. The frame assembly of claim 3, wherein said freewheel is mounted to said rear fastening part by one of said first pair of bearing bolts.

5. The frame assembly of claim 1, wherein said chainstays are arranged so as to extend along only one side of the rear wheel.

6. The frame assembly of claim 1, wherein said spring device of said parallelogram-shaped suspension system includes a spring and an adjustment device at an end of said spring, said adjustment device being operable to displace said end of said spring transversely relative to a longitudinal axis of said spring.

7. The frame assembly of claim 1, wherein said frame assembly further comprises a crank set and a cardan transmission for transmitting power from said crank set to said first cogwheel, said cardan transmission including gimbals having different lengths.

8. The frame assembly of claim 1, wherein said frame assembly further comprises a crank set and a cardan transmission, said parallelogram-shaped suspension system further including a freewheel mounted to said rear fastening part, said cardan transmission being operable to transmit power from said crank set to said freewheel.

9. The frame assembly of claim 1, wherein said parallelogram-shaped suspension system further includes a torsion spring having an arm resting against a displaceable projection of at least one of said first bar and said second bar, said displaceable projection being operable to move by a wire connected to a lever.

10. A frame assembly for a two-wheeled vehicle, comprising:
chainstays; and
a suspension system attached to a rear end of said chainstays, said suspension system including:
  a rear fastening part attached to said rear end of said chainstays, said rear fastening part having a first pair of bearing bolts;
  a wheelholder for holding a rear wheel of the two-wheeled vehicle, said wheelholder having a second pair of bearing bolts;
  a first bar having a first end pivotably connected to a first one of said first pair of bearing bolts and having a second end pivotably connected to a first one of said second pair of bearing bolts;
  a second bar having a first end pivotably connected to a second one of said first pair of bearing bolts and having a second end pivotably connected to a second one of said second pair of bearing bolts, said first bar and said second bar having substantially equal lengths and being arranged substantially parallel, said first bar and said second bar being arranged so as to extend at a downward incline from said rear fastening part towards a rear of said frame assembly;
  a spring device between said rear fastening part and said wheelholder so as to extend downward toward an axle of the rear wheel to thereby generate a spring force; and
  a power transmission device for transmitting power from a first cogwheel mounted to said rear fastening part to a second cogwheel mounted to the rear wheel.

11. The frame assembly of claim 10, wherein said power transmission device comprises a chain linking said first cogwheel and said second cogwheel, said suspension system further including a freewheel mounted to said rear fastening part, said freewheel comprising a plurality of cogwheels including said first cogwheel.

12. The frame assembly of claim 10, wherein said spring device of said suspension system includes a spring and an adjustment device at an end of said spring, said adjustment device being operable to displace said end of said spring transversely relative to a longitudinal axis of said spring.

13. The frame assembly of claim 10, wherein said frame assembly further comprises a crank set and a cardan transmission for transmitting power from said crank set to said first cogwheel, said cardan transmission including gimbals having different lengths.

14. The frame assembly of claim 10, wherein said frame assembly further comprises a crank set and a cardan transmission, said suspension system further including a freewheel mounted to said rear fastening part, said cardan transmission being operable to transmit power from said crank set to said freewheel.

15. The frame assembly of claim 10, wherein said suspension system further includes a torsion spring having an arm resting against a displaceable projection of at least one of said first bar and said second bar, said displaceable projection being operable to move by a wire connected to a lever.

* * * * *